April 17, 1956 — O. G. LEWIS — 2,741,830
UNIVERSAL ENGINE SUPPORT
Filed March 2, 1953

Oliver G. Lewis, Inventor
By Edwin M. Thomas, Attorney

United States Patent Office 2,741,830
Patented Apr. 17, 1956

2,741,830
UNIVERSAL ENGINE SUPPORT

Oliver G. Lewis, Westfield, N. J., assignor to Esso Research and Engineering Company, a corporation of Delaware Application March 2, 1953, Serial No. 339,775

3 Claims. (Cl. 29—289)

The present invention relates to a universal engine support and particularly to a support or mount which will accommodate automotive engines for running, for rapid overhaul, for testing, and the like.

In the prior art various means have been devised for supporting automotive engines for repair, for test operation, and the like when removed from the vehicle chassis. Some of these have been reasonably suitable for engine overhaul in garages, for example, but most of them have not been suitable for supporting an engine while running. In test work relating to the development of automotive engines and fuels and lubricants, therefore, it is frequently necessary or desirable to operate said engine, attaching it to a suitable dynamometer or other energy consuming apparatus in order to study various engine operating factors such as mechanical design, maintenance, special properties of fuels, lubricants and coolants, and the like.

For supporting an automotive engine in operation it is obviously necessary that the supporting structure be sufficiently strong and rigid to withstand severe vibration and still to afford appropriate and adequate access to the engine. In the past it has been necessary, as a rule, to mount engines for operating tests on heavy rigid fixtures which occupy considerable shop and laboratory space when not in use. It is highly desirable that such structures be portable and readily movable from place to place. It is also desirable, obviously, to have maximum access to all parts of the engine for inspection, overhaul and maintenance, as well as for other testing operations such as fuel and lubricant studies, test runs and the like.

An object of the present invention is to design a universal engine support which is both sufficiently sturdy and rigid that it can support heavy motors and also withstand all reasonable vibrations in their operation and which, at the same time, is portable and readily movable.

A further object is to design an automotive engine mount which permits rotating an engine about its main horizontal axis while in the mount to afford ready access to top, bottom or side portions of the engine for inspection, repair, or maintenance.

A further object of the invention is to adapt a universal mount that is suitable for use interchangeably with various automotive engines of different types and sizes so as to make it unnecessary to maintain a variety of mounts when different engines are being repaired or tested.

Further objects will appear more clearly as this description proceeds. Therefore reference will be made next to the attached drawings forming a part of this specification.

In the drawings, Fig. 1 is a perspective view of a universal engine support or mount embodying the features of the present invention and showing an engine supported thereby;

Figure 1:
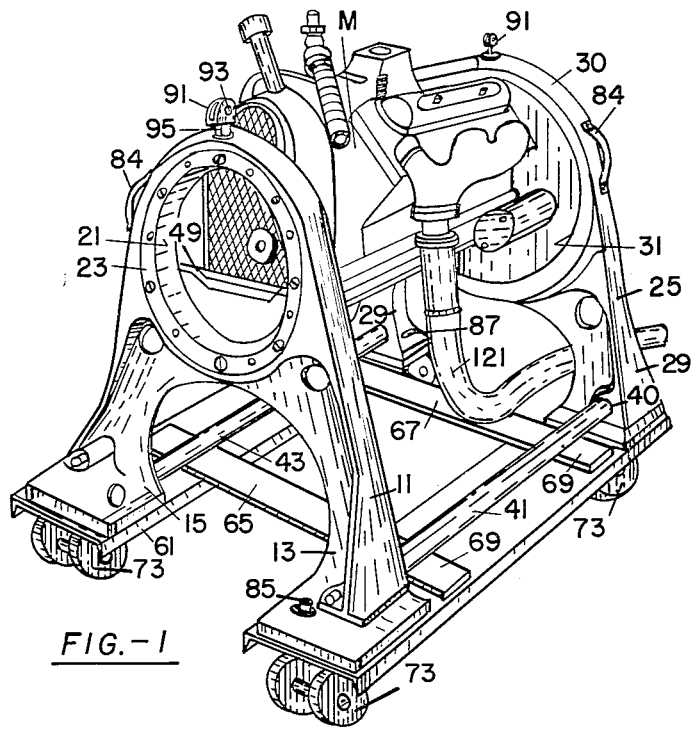

Referring first to Fig. 1 it will be seen that the device or mount of the present invention comprises a pair of generally A-shaped rigid frame members of suitable strong structural material such as cast steel. The front member 11 rests on two feet 13 and 15 which are substantially identical. Member 11 comprises an upper and generally circular open frame portion 17. The circular frame portion 17 surrounds a large circular opening in which is mounted for free rotation an engine supporting ring member 21. This ring is kept in place against lateral displacement from the ring or open frame 17 by front and rear flange elements one of which is removable. This removable flange 23 is bolted to the ring member 21. See Fig. 5 which shows in section a similar arrangement for the rear ring member to be described presently.

Figures 3, 4, 5, 6:
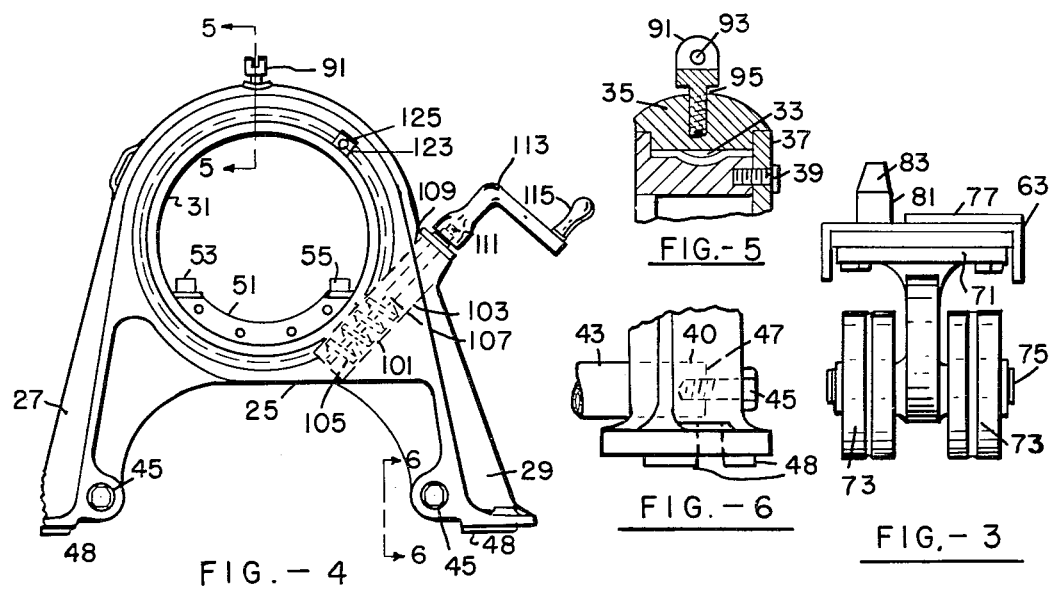
Fig. 3 is an enlarged detailed end view of one of the main support bars of the base or dolly structure of Fig. 2 showing the castor or anti-friction roller supports therefor and related elements.
Fig. 4 is an elevational end view taken substantially from the rear of Fig. 1 and showing the apparatus for rotating the mounting mechanism so as to turn a complete engine or motor about a horizontal axis.
Fig. 5 is an enlarged detailed sectional view of part of the mechanism of Fig. 4 taken substantially on the line 5—5 of Fig. 4, looking in the direction of the arrows.
Fig. 6 is an enlarged detailed view of a portion of the base or foot member of the structure of Fig. 4 taken substantially at the line 6—6 and looking in the direction of the arrows.

The rear upright end or frame member is indicated at 25 and it likewise has two foot members 27 and 29. As with end member 11 the upper portion comprises a circular body 30 with a large circular opening in which is mounted an engine supporting ring 31. Referring to Figs. 4 and 5 it will be seen that the engine supporting ring 31 is provided on its outer periphery with gear teeth, preferably of worm wheel type. These are to fit inside the circular portion 30 as indicated at 33, Fig. 5. The ring 31 has on one vertical side or face a flange 35 which extends outside the periphery of the gear element 33 to engage or abut against the side of frame member 25 and prevent lateral displacement of the ring from frame element 30 in one direction. On the opposite side the ring 31 has secured thereto a ring or plate member 37 which extends beyond its outer periphery and engages the opposite side of frame member 35 to prevent lateral displacement in the other direction. This retaining flange or ring 37 is secured to the gear ring 31 by appropriate fastenings such as bolts 39.

The foot portions 13, 15, 27 and 29 of the respective end frame members 11 and 25 are adapted to receive in suitable sockets 40 a pair of longitudinally extending bars or detachable frame elements 41 and 43. As best shown in Fig. 6 these elements are preferably of tubular cross-section. In assembly, the bars 41 and 43 are firmly fastened to the foot members by heavy bolts 45 which extend into solid plugs or end portions 47 of the longitudinal members. The bottom of each of the foot members has formed thereon one or more keys or lugs 48 for purposes to be described hereinafter.

Since automotive engines vary both in size and in number and arrangement of cylinders their lengths vary considerably. In order to accommodate various types and sizes of automotive engines the bars or longitudinal frame members 41 and 43 may be made adjustable in length per se or if desired alternative sets of longer or shorter members may be substituted to adjust the overall frame or mount length as desired. Such adjustment in length is not always necessary, however, since brackets or adapters suitable for various engines or motors may be readily attached to the respective ring members 21 and 31 to support various types of motors. One such adapter is shown at 49 in the front of Fig. 1 and another is shown at 51, Fig. 4, attached to the rear ring by suitable attaching means which need not be described in detail. The mounting or adapter 51 may be provided with supporting blocks 53 and 55 which may be either of rigid material or of resilient material depending upon how the engine is to be supported. In general, it is desirable to have rubber or other resilient material interposed between the engine support and the engine itself and for this reason the elements 53 and 55 may be preferably blocks of rubber of suitable type.

Figure 2:
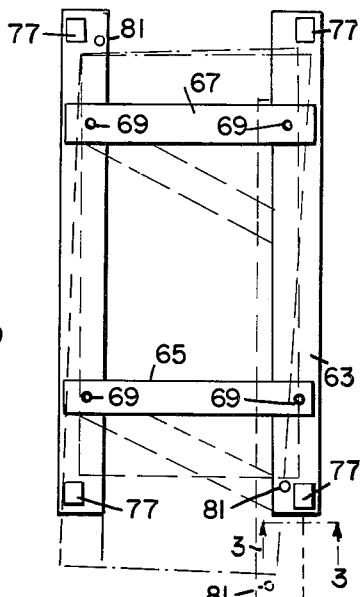
Fig. 2 is a plan view of the adjustable supporting base or dolly which forms part of the structure and on which the engine supporting elements per se are mounted.

In order to make the unit so far described fully portable it is desirable to mount it upon a dolly or portable base and such a base is illustrated in Figs. 1 and 2. One of the features of the present invention involves a special design for this supporting base by which it can readily be adapted for different longitudinal adjustments between the end frame members 11 and 25.

Referring to Fig. 2 as well as Fig. 1 it will be seen that the supporting base comprises a pair of rigid longitudinal bars which may be of angle cross-section if desired but, as shown, are of channel beam construction. These are indicated at 61 and 63. They are maintained in parallel relationship by connecting them to each other with a pair of parallel transverse tie bar members 65 and 67. These tie members are pivotally attached at each end to the longitudinal bars 61 and 63 by appropriate bolts or the like as indicated at 69. With this arrangement the base, when separated from the upper mounting apparatus, may be folded up by bringing the two side bars into juxtaposition in an obvious manner. This reduces space requirements for storage when the base is not in use.

Referring for the moment to Fig. 3 the longitudinal dolly frame members 61 and 63, which are substantially identical, may be supported at each of their ends upon a bracket 71 which in turn is supported on wheels or rollers 73 mounted on an axle 75 which passes through the lower part of the bracket 71. A pillow block member is fastened by appropriate means, such as by welding or riveting to the top of the longitudinal bars as indicated at 77. One of these blocks is mounted on each end of each of the longitudinal bars 61 and 63. The purpose of these blocks is to support the legs of the upper frame, 13, 15, 27, 29, so they will not rest upon the keys or lugs 48 and mar them. These keys are useful for firmly positioning the mount on a floor or other base for extended operation. Also at the front end of one bar 61 or 63 and at the rear end of the other is mounted an upwardly projecting stud member 81 having a conical top portion 83, as shown in Fig. 3. Handles 84 are provided on frame members 17 and 30 for wheeling the apparatus about.

Each of the upright upper frame members 11 and 25, previously described, is provided with an opening in each of its foot portions. Such an opening is shown at 85 in the foot 13 of end member 11, Fig. 1, and at 87 in the foot 29 of member 25. Two of these openings, one in each of the end frame members 11 and 25, fit over the studs 81 on the dolly frame and prevent lateral displacement of the upper frame with respect to the dolly frame. When the upper frame is removed from the dolly and set on a floor or other fixed base for extended operation, a bolt, fixed to the base with a head in a T-slot or the like, is put through each of the four openings 85 and a nut is tightened down on each bolt to hold the mount securely. These bolts are not shown in the drawings.

Each of the end frame members 11 and 25 is provided at the top of its circular part with a clevis 93 through which a pin can be inserted into a lifting link, the clevis being secured to the frame member by a stud element 95 threaded into the frame. See Fig. 5 especially. Any suitable lifting hoist device may be connected to the clevises 95 by placing a chain link or other lifting element between the fork portions of the clevis and inserting a pin through the opening 93 in an obvious manner. When this is done the upper frame assembly, with or without an automotive engine mounted therein, can be lifted off the base member and set onto a floor, bed platform or other base. The movable frame member or dolly 61, 63, etc. can be adjusted to fit any reasonable spacing between the end frame members 11 and 25 by simply moving one bar 61 or 63 endwise relative to the other. Thus, as shown in dotted lines in Fig. 2 the bar 63 may be moved forward so that the distance between the respective pins 81 is equal to the diagonal distance between the diagonally opposite openings 85 and 87 described above. It will be noted that only two of the four openings 85 are used on the dolly. Considerable adjustment in overall mount length can be made without appreciably varying the width of the parallelogram base. In the case of longitudinal extension of the mount, as shown in the dotted lines of Fig. 2, the foot members 29 and 13, for example, respectively are aligned upon the studs 81 and the other foot members 15 and 27 rest on appropriate parts of the pillow blocks 77 on the alternate ends of longitudinal bars 61 and 63. Slight variations from parallel alignment between the upper frame and the base frame are not sufficient to affect stability of the overall assembly.

In the maintenance and repair of automotive engines and, to some extent, in their inspection and testing it is desirable to turn the motor on its side or even upside down for convenient access to certain operating parts. This is readily accomplished according to the present invention, by providing a worm shaft 101 in a suitable housing formed in one of the frame elements, e. g. 25, as indicated at 103, Fig. 4. The worm shaft has appropriate thrust bearings 105 and 107 and is mounted on a shaft 109 having an angular end portion 111 protruding from the housing. A crank element 113 may be provided for rotating the worm, being provided with a suitable handle 115. If desired an ordinary wrench may be used in lieu of the handle and it is preferable to make the shaft extension 111 of a size and shape to fit standard mechanics' tools.

With the worm and gear arrangement just described the ring gear 33 and hence the engine supporting ring 31 may readily be rotated in either direction to invert the motor, turn it on its side, or revolve it to any desired angular position about a horizontal axis coinciding with the centers of the rings 21 and 31 which are in longitudinal alignment.

The large openings in the end frame members 17 and 30 make it convenient to overhaul engines by withdrawing cam shafts and crank shafts and other parts which would not be possible or convenient if these large openings were not provided.

In Fig. 1 the apparatus is shown assembled with an automotive engine M secured to the respective ring members 21 and 31 by appropriate means which are not disclosed in detail. As indicated above, the mounting brackets on various motors may vary considerably in design and location but universal adaptors may readily be provided on the rings 21 and 31 or may be mounted between these two rings and supported by both as will be obvious to those skilled in the art. The bars 41 and 43 are either adjustable in and of themselves, or interchangeable sets of such bars, of various lengths, may be utilized to provide various adjustable lengths. In either case the movable base or dolly support 61, 63, etc. is readily adaptable to a substantial adjustment in length. This base support, mounted on friction reducing wheels or rollers, makes it relatively easy and convenient to move the entire structure, with or without a motor therein, from place to place.

In operating an engine M supported by front and rear ring units 21 and 31, a suitable tube 121 may be attached for carrying away exhaust gases from the engine. The operating engine unit may be attached to a dynamometer not shown, or to other energy-consuming apparatus when it is desired to operate a motor under load. When this is done, the mount is ordinarily lifted off the dolly and secured to the floor as described above. By varying the cooling system, for example by maintaining a jacket temperature which is predetermined through a thermostat and coolant circulating system and the like, uniform operating conditions over extended periods of time may be maintained. The rigid and convenient mount makes it possible to operate the engine in a highly accessible and movable mount and to vary its operation under close control. This facilitates experimentation in connection with research and development work on fuels and lubricants as well as the study of engines per se. It will be understood, however, that the present invention may also be used for simple overhaul work on automotive engines and it may be used for supporting other comparable apparatus as well as automotive engines as will be apparent to those skilled in the art.

Various modifications may be made in the apparatus without departing from the spirit of the invention. Thus, other rotating means may be provided and if desired both of the end rings 21 and 31 may be made independently controllable by providing suitable rotating and locking means. Ordinarily this is not necessary, control of one of these rings being sufficient. For extended periods of operation it may be desirable to lock the rotatable mounting 31 against accidental or unintentional rotation which the ring gear and worm control might possibly permit because of vibration. For this purpose a clamping device 123 may be drawn tightly against the ring 31 by a bolt or the like 125 as indicated in Fig. 4. It will, of course, be released when the engine or motor is to be rotated about a horizontal axis. The clamping device 123, 125 may also be used to accurately position the ring 31 in a desired clamped position by providing a detent with which the clamping element engages.

When the apparatus is set up for driving a dynamometer under load, it is usually most convenient to use a universal joint coupling between the engine and the dynamometer. Experience has shown that it is not desirable to have or permit exact axial alignment between the drive shaft and the driven shaft. Hence the keys 48 on the feet of the mount are fitted into properly located notches or detents so as to preserve the desired misalignment which is needed for satisfactory drive through universal joints. The keys 48 and their counterparts in the floor of the test room are purposely misaligned with respect to the dynamometer or engine loading device to accomplish this purpose.

What is claimed is:

1. An engine mount which comprises a pair of rigid, upright end frame members of which each has an upper end, a lower end and inner and outer vertical surface portions, and which defines an enlarged circular orifice of horizontal axis opening through said surface portions at said upper end, said orifice having an inner and an outer end corresponding to said frame surface portions, and a cylindrical wall surface intermediate said ends, a means for rigidly uniting said frame members in horizontally spaced, opposed, substantially parallel relation with the orifices defined by said frame members substantially in axial alignment, and means for mounting an engine intermediate said frame members for rotation about the axis of said orifices including a support ring assembly fitted in each orifice for slideable rotation therein, wherein each ring assembly comprises an annular body having inner and outer edge portions and a peripheral edge portion engageable with said orifice intermediate wall portion in surface contact therewith, a flange integral with one edge portion of said annular body, extending radially beyond said peripheral edge portion in substantially right angular relation thereto, said flange having an inner face adapted to engage said frame member for rotary sliding surface contact about the periphery of said frame orifice at one end thereof, an annular flange plate adapted for attachment to the other end of said annular body concentrically therewith to extend radially beyond said annular body in substantially right angular relation to the peripheral edge thereof, said flange plate having an inner face adapted to engage said frame member for rotary sliding surface contact about the periphery of said frame orifice at the other end thereof, engine mount support means, adapted for fixed engagement with mounting means carried by said engine, said support means being secured in said support ring assembly and disposed so as to extend outwardly from the inner end of said orifice, and detent means operable to retain said ring assembly against rotation in said orifice.

2. In an apparatus according to claim 1, and in combination with said means for mounting an engine intermediate said end frame members, a means for rotating at least one of said ring assemblies in said frame orifice, comprising a peripheral series of gear teeth defined in the peripheral edge of said ring body, a passageway defined in said end frame member, said passageway intersecting the intermediate wall of said orifice defined by said end frame member, and opening therethrough, a worm shaft disposed in said passageway and adapted operably to engage said gear teeth defined in the peripheral edge of said ring body, and means for rotating said worm shaft.

3. In an engine mount according to claim 1, means providing a mobile base frame support for said mount, which comprises a footed base end portion at the lower end of each frame member, wherein each base end portion defines a pair of vertical passageways therethrough disposed in spaced relation at opposite sides of said frame member, a mobile base frame platform adapted for longitudinal extension including a pair of parallel elongated side frame elements having upper and lower surface portions, and a pair of end frame elements pivotally connected to said side frame elements in parallel spaced relation intermediate the ends of said side frame elements, a pillow block mounted on the upper surface portion of each end of each side frame element said blocks being adapted to receive said end frame member footed portions in slideable surface contact, a first stud pin mounted at one end of the upper surface portion of one side frame element, extending vertically upward therefrom and adjacent the pillow block thereon, a corresponding second stud pin similarly mounted on the other one of said side frame elements in diagonally opposite relation to said first stud pin, each of said stud pins being adapted to be received in a passageway defined in an end frame footed portion and at opposite ends and sides of said engine mount, and a platform carriage wheel mounted at each end of each side frame member on the lower surface portion of each member.

References Cited in the file of this patent

UNITED STATES PATENTS

| Number | Name | Date |
| --- | --- | --- |
| 329,623 | Coleman | Nov. 3, 1885 |
| 411,789 | Delany | Oct. 1, 1889 |
| 1,008,821 | Hathorn | Nov. 4, 1911 |
| 1,072,743 | Lauffenberg et al. | Sept. 9, 1913 |
| 1,225,651 | Krouse | May 8, 1917 |
| 1,283,588 | Staley | Nov. 5, 1918 |
| 1,291,087 | Nelson | Jan. 14, 1919 |
| 1,379,961 | Chilton | May 31, 1921 |
| 1,409,266 | Werth | Mar. 14, 1922 |
| 1,450,511 | Nielsen | Apr. 3, 1923 |
| 1,481,503 | Carswell et al. | Jan. 22, 1924 |
| 1,600,835 | Manley | Sept. 21, 1926 |
| 2,003,162 | Ulmer | May 28, 1935 |
| 2,329,613 | Hokanson et al. | Sept. 14, 1943 |
| 2,329,860 | Staley | Sept. 21, 1943 |
| 2,472,952 | Lennard | June 14, 1949 |
| 2,565,473 | Cline | Aug. 28, 1951 |